(12) United States Patent
Parker et al.

(10) Patent No.: US 11,046,280 B2
(45) Date of Patent: Jun. 29, 2021

(54) LATERAL OCCUPANT ENGAGEMENT CUSHIONS

(71) Applicant: Autoliv ASP, Inc., Ogden, UT (US)

(72) Inventors: Don Larry Parker, Syracuse, UT (US); Terry Alan Wheelwright, Morgan, UT (US); Charles Paul Dinsdale, Farr West, UT (US); Christine Elizabeth Devey, Wellsville, UT (US); Derek John Wiscombe, Morgan, UT (US); Andrew Lawrence Holliday, Pleasant View, UT (US)

(73) Assignee: Autoliv ASP, Inc., Ogden, UT (US)

( * ) Notice: Subject to any disclaimer, the term of this patent is extended or adjusted under 35 U.S.C. 154(b) by 31 days.

(21) Appl. No.: 16/518,838

(22) Filed: Jul. 22, 2019

(65) Prior Publication Data
US 2021/0024031 A1 Jan. 28, 2021

(51) Int. Cl.
| | |
|---|---|
| *B60R 21/231* | (2011.01) |
| *B60R 21/207* | (2006.01) |
| *B60R 21/201* | (2011.01) |
| *B60R 21/217* | (2011.01) |
| *B60R 21/00* | (2006.01) |

(52) U.S. Cl.
CPC ...... *B60R 21/23138* (2013.01); *B60R 21/207* (2013.01); *B60R 21/2176* (2013.01); *B60R 21/201* (2013.01); *B60R 2021/0006* (2013.01); *B60R 2021/23146* (2013.01)

(58) Field of Classification Search
CPC ............ B60R 21/23138; B60R 21/207; B60R 2021/23107; B60R 2021/23146; B60R 21/201; B60R 2021/0006
See application file for complete search history.

(56) References Cited

U.S. PATENT DOCUMENTS

| | | | |
|---|---|---|---|
| 5,636,862 A * | 6/1997 | Cheung | B60R 21/207 280/730.2 |
| 8,485,551 B2 * | 7/2013 | Dainese | B60R 21/207 280/730.2 |
| 8,690,187 B2 * | 4/2014 | Fukawatase | B60R 21/207 280/730.2 |
| 9,981,624 B2 * | 5/2018 | Perlo | B60R 21/207 |
| 10,618,492 B2 * | 4/2020 | Aranzulla | B60R 21/203 |
| 10,696,261 B2 * | 6/2020 | Cheng | B60N 2/01 |
| 10,730,470 B2 * | 8/2020 | Choi | B60R 21/214 |

(Continued)

FOREIGN PATENT DOCUMENTS

| | | | | |
|---|---|---|---|---|
| FR | 3065929 A1 * | 11/2018 | ... | B60R 2021/23146 |
| WO | WO 2020130427 A1 * | 6/2020 | .......... | B60R 21/207 |

*Primary Examiner* — Faye M Fleming
(74) *Attorney, Agent, or Firm* — Matthew D. Thayne; Thayne and Davis LLC

(57) ABSTRACT

Lateral airbag cushions for preventing or inhibiting inboard occupant excursion. Some embodiments may comprise an inflatable cushion configured to deploy adjacent to a vehicle seat laterally of a vehicle occupant and a tether coupled with the inflatable cushion. The tether may be configured to be coupled to the vehicle seat at opposite ends and may be configured to, upon deployment, form the inflatable cushion into a pocket or other lateral engagement structure adjacent to the vehicle occupant to engage a shoulder and/or arm region of the vehicle occupant to prevent or at least inhibit inboard/lateral excursion during an impact event.

19 Claims, 7 Drawing Sheets

(56) References Cited

U.S. PATENT DOCUMENTS

| | | | |
|---|---|---|---|
| 2019/0225183 A1* | 7/2019 | Garnier | B60R 21/207 |
| 2019/0248323 A1* | 8/2019 | Saito | B60R 21/23138 |
| 2019/0275974 A1* | 9/2019 | Yetukuri | B60R 21/231 |
| 2019/0283700 A1* | 9/2019 | Kwon | B60R 21/23138 |
| 2019/0299903 A1* | 10/2019 | Nagasawa | B60R 21/2338 |
| 2019/0299910 A1* | 10/2019 | Kanegae | B60R 21/23138 |
| 2019/0389420 A1* | 12/2019 | Dry | B60R 21/231 |
| 2020/0114858 A1* | 4/2020 | Henriksson | B60R 21/235 |
| 2020/0307488 A1* | 10/2020 | Kondrad | B60R 21/215 |
| 2020/0307489 A1* | 10/2020 | Line | B60R 21/23184 |
| 2020/0307490 A1* | 10/2020 | Nagasawa | B60N 2/427 |
| 2020/0317154 A1* | 10/2020 | Choi | B60R 21/2338 |

* cited by examiner

LATERAL OCCUPANT ENGAGEMENT CUSHIONS

SUMMARY

Vehicle side impact events, although quite common, provide unique challenges in providing suitable protection to drivers and other vehicle occupants. Although front and rear impacts may be adequately addressed by providing frontal airbag cushions, side impact events may result in other injuries due to inboard excursion of the occupant, such as the occupant's head, neck, shoulder, and/or arms. During such events with two vehicle occupants, head-to-head impacts may result from side impact events in vehicles having only standard frontal/driver airbag cushions.

The present inventors have therefore determined that it would be desirable to provide apparatus, systems and methods that overcome one or more of the foregoing limitations and/or other limitations of the prior art. In some embodiments, the inventive concepts disclosed herein may therefore provide for a supplemental airbag cushion, which may deploy from and/or adjacent to a vehicle seat, to restrain the occupant's inboard shoulder region and/or adjacent regions, such as the upper arm and/or head regions, to prevent or at least reduce inboard excursion.

In a more particular example of an airbag cushion assembly according to some embodiments, the airbag cushion assembly may comprise an inflatable cushion configured to deploy adjacent to a vehicle seat laterally of a vehicle occupant and a tether coupled with the inflatable cushion and configured to be coupled to the vehicle seat at opposite ends. The tether may be configured to, upon deployment, form the inflatable cushion into a pocket or another suitable structure adjacent to the vehicle occupant to engage a shoulder and arm region of the vehicle occupant.

In some embodiments, the inflatable cushion may comprise a primary chamber and a plurality of finger chambers coupled with the primary chamber. In some embodiments, following deployment, each of the plurality of finger chambers may extend at an at least substantially perpendicular angle from the primary chamber.

In some embodiments, the plurality of finger chambers may comprise an upper set of finger chambers, a middle set of finger chambers, and a lower set of finger chambers, wherein each of the middle set of finger chambers is longer than each of the upper and lower set of finger chambers, which may form a bow shape in some embodiments.

In some embodiments, following deployment the primary chamber may extend along an elongated axis and/or spine of the inflatable cushion.

The tether may be fixed in length or, alternatively, may be configured to be variable in length following deployment. Some embodiments may therefore comprise a tether pretensioner or other tether extension, retraction, and/or locking device configured to fix a released length of the tether during deployment. In some such embodiments, the tether pretensioner/device may be configured to lock the tether in place upon experiencing a threshold force during deployment and/or to retract the tether during deployment. In some embodiments configured to retract the tether, the retraction of the tether may result in bending at least a portion of the inflatable cushion to form the pocket.

Some embodiments may further comprise a lateral head support cushion configured to deploy above the primary chamber adjacent to and lateral of the vehicle occupant's head. The lateral head support cushion may be fluidly coupled with the primary chamber or may be deployable from a separate inflator.

In an example of a vehicle including an inflatable cushion, or the inflatable cushion standing alone, according to some embodiments, the inflatable cushion may be configured to deploy adjacent to a vehicle seat laterally of a vehicle occupant and may comprise a primary chamber extending along an elongated axis of the inflatable cushion following deployment. A tether may be mounted or otherwise coupled to the vehicle seat and may extend about a peripheral edge of the inflatable cushion opposite from the primary chamber following deployment. The tether may be configured to, upon deployment, form the inflatable cushion into a pocket adjacent to the vehicle occupant to engage a shoulder and arm of the vehicle occupant. The inflatable cushion may further comprise a plurality of finger chambers extending from the primary chamber, such as at an angle (in some cases, a right angle).

In some embodiments, the tether may extend along distal ends of each of the respective finger chambers following deployment.

In some embodiments, the tether may be the only tether coupled to the inflatable cushion and/or used in connection therewith and/or may be the only/sole tether used to form the pocket.

In some embodiments, the tether may be fixed to the seat at both opposite ends of the tether. Some embodiments may further comprise a tether release mechanism. In some such embodiments, the tether may be fixed to the seat at a first end of the tether and may be at least one of extendable and retractable from the tether release mechanism at a second end of the tether opposite the first end such that a length of the tether following deployment is variable. In some embodiments, the tether release mechanism may be configured to lock the tether in place upon experiencing a threshold force during deployment.

The inflatable cushion may be positioned within an elongated airbag module or cover positioned within the vehicle seat, which may, in some embodiments, extend at least partially along a side edge of the vehicle seat and at least partially along a top edge of the vehicle seat, which may form an inflatable structure that extends along two intersecting planes.

Some embodiments may further comprise a lateral head support cushion configured to deploy above the primary chamber adjacent to and lateral of the vehicle occupant's head.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
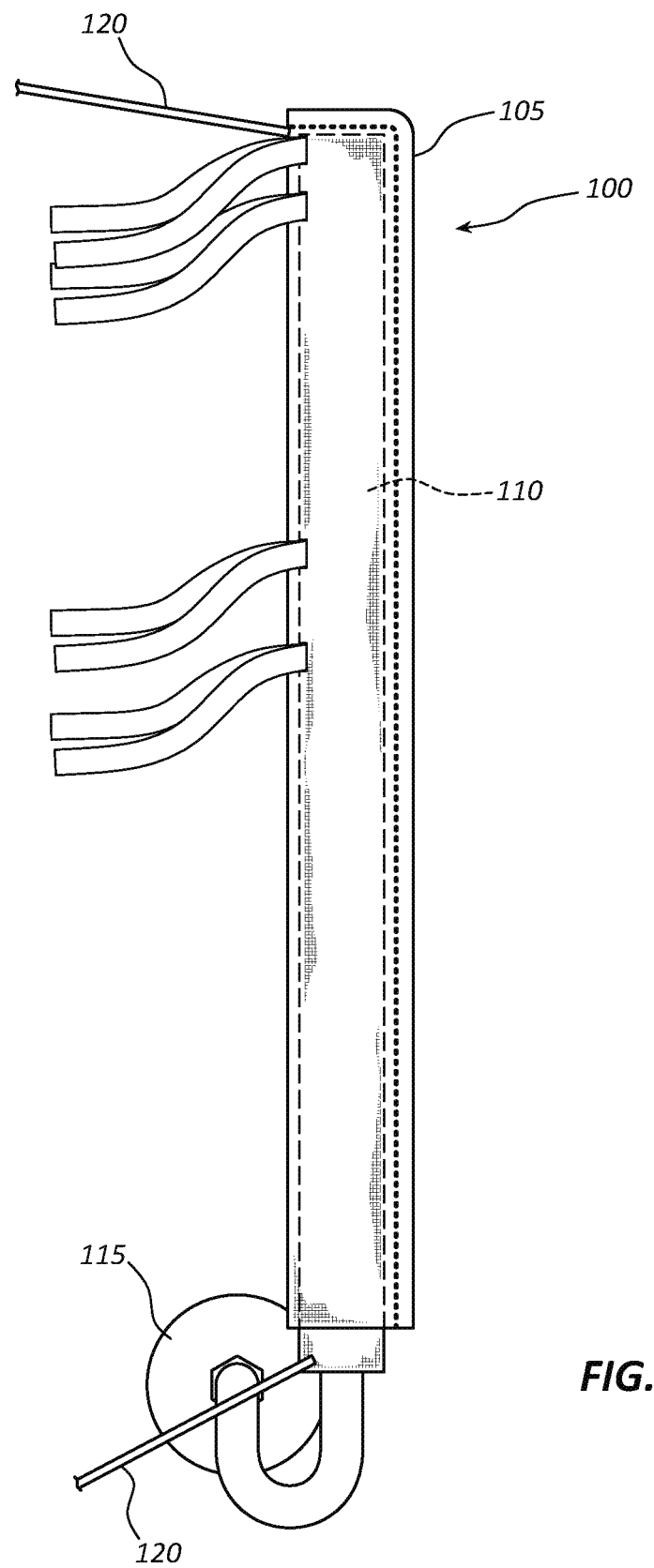
FIG. 1 depicts an airbag cushion assembly for preventing or at least inhibiting lateral excursion according to some embodiments.

FIG. 1 depicts an airbag cushion assembly 100 according to some embodiments. Airbag cushion assembly 100 comprises a housing or cover 105 from which an inflatable cushion 110 may be deployed, preferably from a vehicle seat, as described in greater detail below. More particularly, inflatable cushion 110 may be configured to deploy from and/or adjacent to a vehicle seat laterally of a vehicle occupant. Airbag cushion assembly 100 further comprises an inflator 115, which is shown extending from one end of cover 105 but may be positioned within cover 105 in alternative embodiments. Finally, airbag cushion assembly 100 comprises a tether 120, which, as described below, is coupled with the inflatable cushion 110 and configured to be coupled to the vehicle, such as mounted to the vehicle seat at one or both ends of tether 120. Again, as described in detail below, the tether 120 may be configured to, upon deployment, form the inflatable cushion 110 into a bent and/or curved pocket adjacent to a vehicle occupant to engage a shoulder, arm, and/or head region of the vehicle occupant.

In this manner, excursion of the occupant's head and/or adjacent body portions may be prevented or at least reduced, particularly during far-side crashes. This may help, for example, prevent or reduce the possibility for head collisions/interactions between adjacent occupants during far side or other impact events. In preferred embodiments, the airbag assembly 100 may be positioned and configured to contact an occupant's shoulder, arm, and/or head region on a side opposite the side of engagement with the seatbelt associated with the vehicle seat to which the assembly 100 is coupled, which is typically the inboard shoulder/side.

Figure 2:
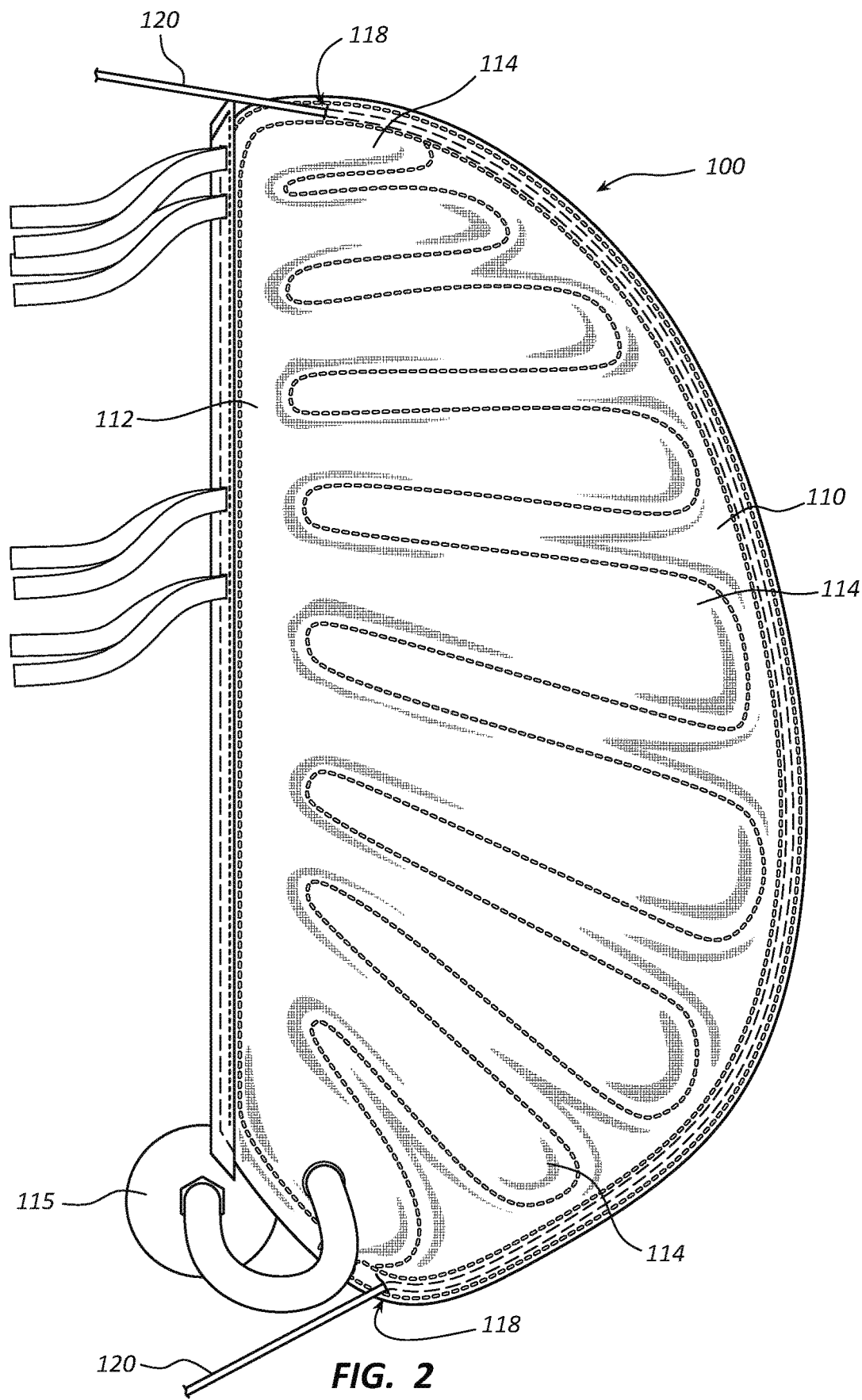
FIG. 2 depicts the airbag cushion assembly of FIG. 1 following deployment.

FIG. 2 depicts airbag assembly 100 following deployment. As shown in this figure, airbag cushion 110 comprises a plurality of inflatable chambers, each of which may be fluidly coupled to one another. More particularly, airbag cushion 110 comprises a primary chamber 112, which may be considered a "spine chamber" in the depicted embodiment as it extends along an elongated axis or spine of the assembly 100, which axis/spine may be coupled to a vehicle seat so as to extend along or adjacent to a peripheral edge of the seat. A plurality of finger chambers 114 extend from primary chamber 112. In the depicted embodiment, each of the finger chambers 114 extends at an at least substantially perpendicular angle from the primary chamber 112. However, this need not be the case in all contemplated embodiments.

In addition, as shown in FIG. 2, the deployed cushion 110 comprises a bow shape. In the depicted embodiment, this is accomplished by forming the upper and lower finger chambers so as to have shorter lengths than the middle finger chambers. Each of the various chambers may be formed using sew lines, which, in some embodiments (including the embodiment depicted in FIG. 2) may be formed with spacing in between each finger chamber 114 to form non-inflatable regions between each adjacent finger chamber 114.

As also shown in FIG. 2, tether 120 may extend along a peripheral edge of cushion 110. This may be done by forming a tunnel 118 therein. Tunnel 118 may be continuous, as shown in FIG. 2, or may be formed using discrete tunnel portions intermittently about the periphery of the cushion 110. As described below, tether 120 may be used to form a suitable shape, such as a pocket, for engagement with a vehicle occupant's shoulder, arm, and/or head region on one side during deployment. This may be accomplished using a tether of fixed length, a variable length tether, a tether pretensioner, a tether locking mechanism, various sensors, and the like, as also described elsewhere herein. In some embodiments, including the depicted embodiment, tether 120 may be the only or sole tether used to form the pocket or other shape and/or may be the only or sole tether used in assembly 100.

Figure 3:
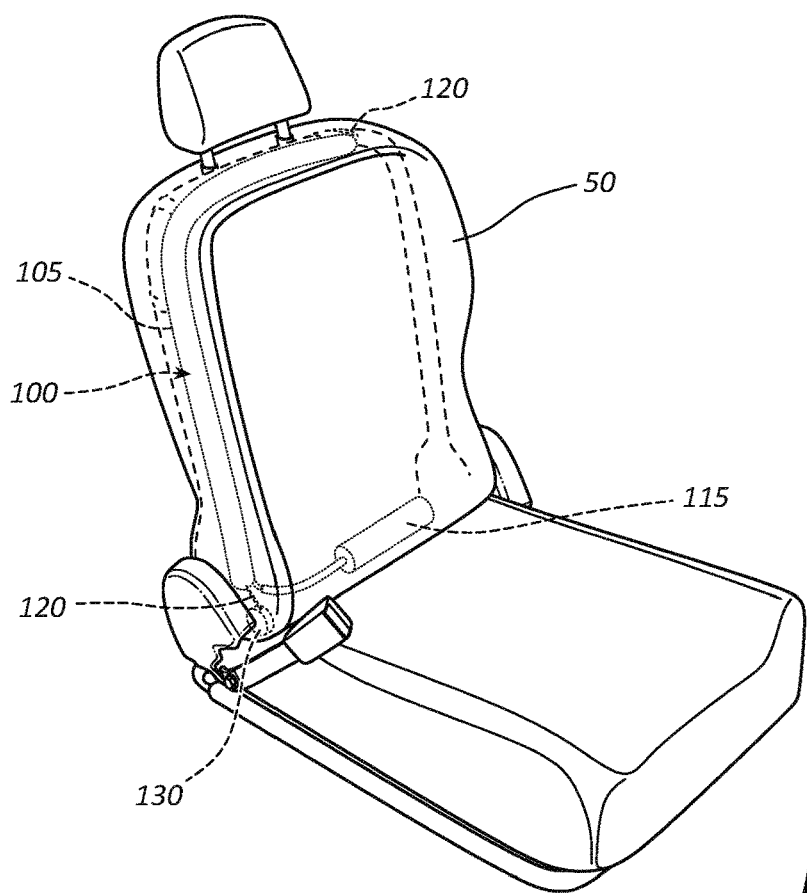
FIG. 3 depicts a vehicle seat incorporating the airbag cushion assembly prior to deployment.
Figure 4:
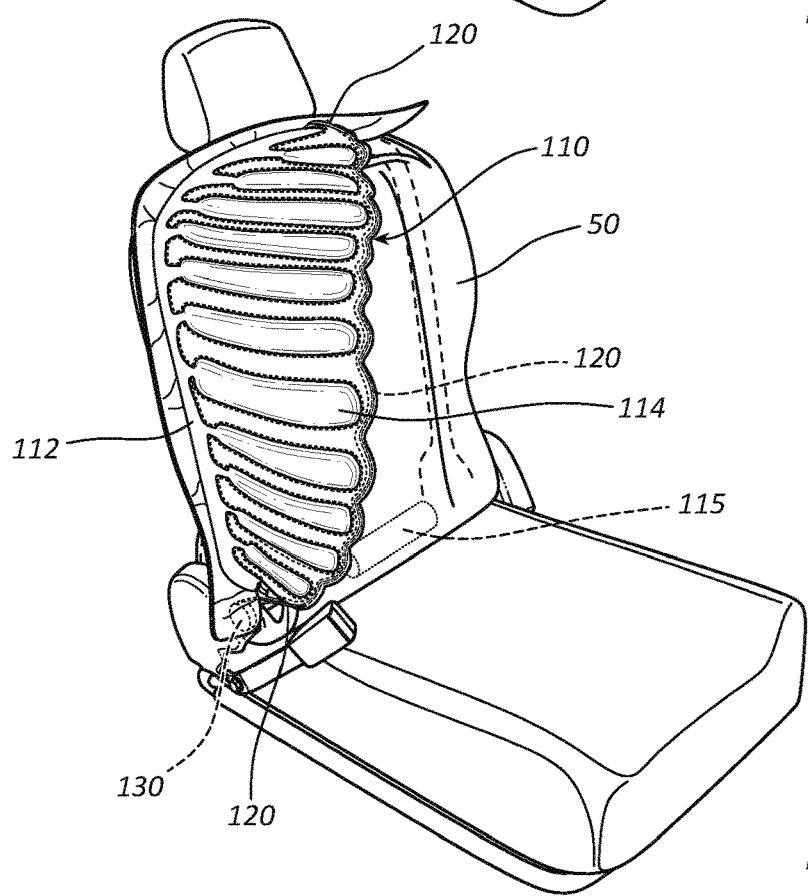
FIG. 4 depicts the vehicle seat following deployment of the airbag cushion to provide lateral support for preventing or at least inhibiting lateral/inboard excursion.
Figure 5:
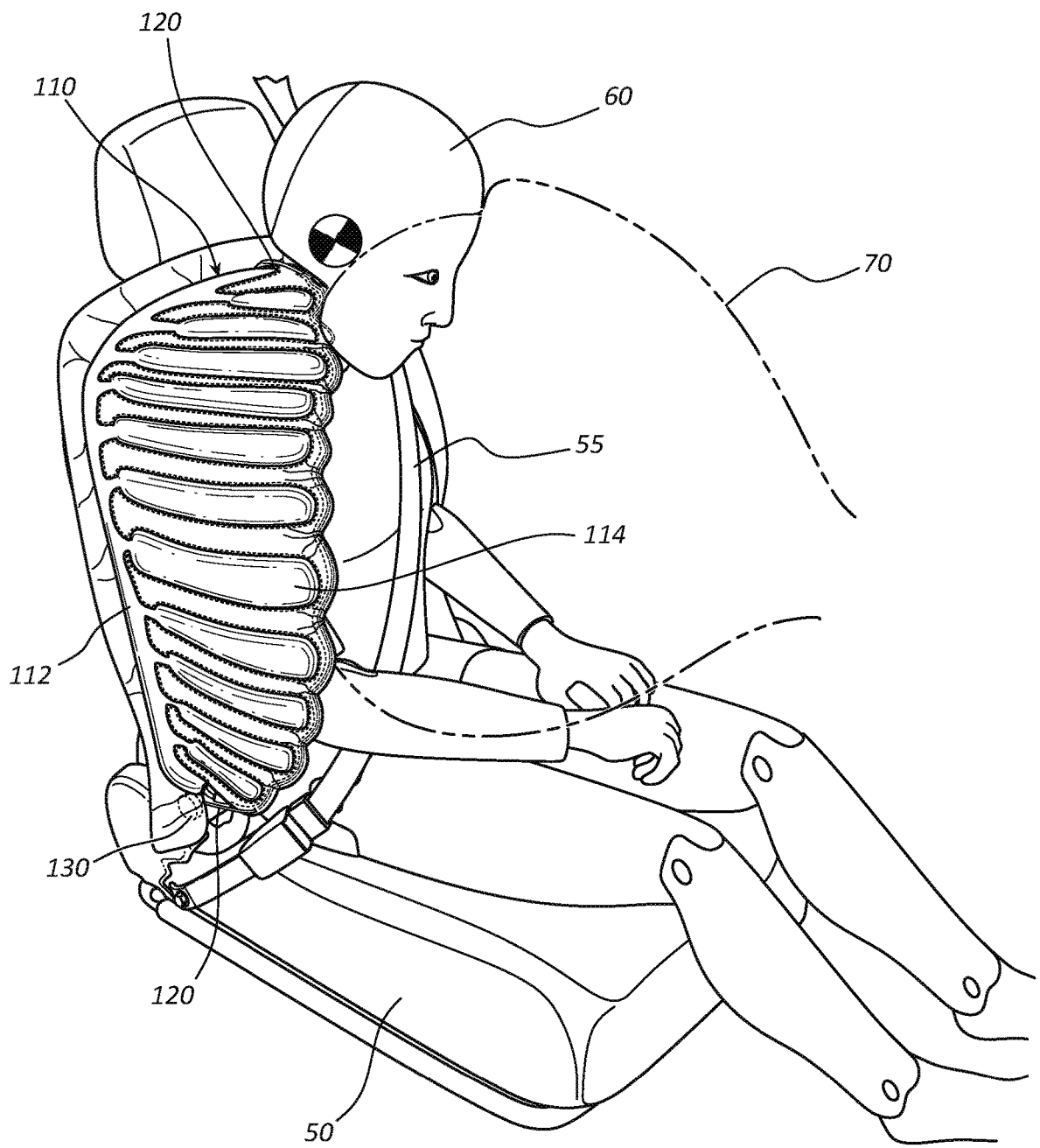
FIG. 5 depicts a vehicle occupant being restrained from lateral/inboard excursion by the airbag cushion.

FIGS. 3-5 depict airbag assembly 100 mounted within a vehicle seat 50 and during various stages of deployment. As shown in FIG. 3, airbag assembly 100 may be positioned within seat 50 such that the housing/module/cover 105 of the assembly extends along a side of seat 50, preferably opposite a side corresponding to a vehicle occupant's shoulder that would engage a seatbelt 55 (see FIG. 5), and partially along a top portion of seat 50. It is contemplated, however, that other embodiments may be coupled to a seat without being positioned within the seat and/or may extend along only a side portion or be positioned at other suitable locations in and/or adjacent to a vehicle seat. Inflator 115 is shown positioned within seat 50 as well. However, again, inflator 115 may be positioned elsewhere as desired. As previously mentioned, in some embodiments, inflator 115 may be positioned within the housing/cover 105 of assembly 100.

In addition, tether 120 is shown mounted to seat 50 at opposite ends of cover/housing 105. In some embodiments, tether 120 may be affixed to these opposing ends so as to define a fixed length. Alternatively, various mechanisms may be used to make this length variable, lock the tether 120 in place following a predetermined release of the tether 120, and/or retract the tether 120 during deployment. For example, in the depicted embodiment, a retraction mechanism 130 may be provided that may, similar to various seatbelt mechanisms, release tether 120 to a desired length and then lock it in place to form cushion 110 into a desired shape. Again, in other embodiments, mechanism 130 may be omitted and tether 120 may be fixed in length and rigidly coupled to seat 50 or an adjacent structure at both ends.

As shown in FIG. 4, tether 120 may be configured to form cushion 110 into a bow shape, pocket, and/or other shoulder-engaging structure. As also shown in this figure, each of the various finger chambers 114 extends perpendicular from the primary chamber 112, which extends along the periphery of the seat 50. Tether 120 extends along and/or adjacent to the peripheral edge of the pocket/shoulder-engaging structure and is preferably configured to keep the structure in place during deployment and upon engaging an occupant during an impact event. Because of the placement of the opposing ends of tether 120 along intersecting/non-parallel lines, the pocket formed by cushion 110 may, in some embodiments, be at least partially curved as well to partially wrap around an occupant's shoulder region and provide both lateral and partial frontal protection to the occupant's shoulder, arm, and/or side region (in some embodiments, also the head region, as discussed below).

FIG. 5 depicts cushion 110 during deployment with a vehicle occupant 60 positioned within seat 50. As better shown in this figure, the structure formed by the inflated cushion 110 may be configured to extend forward from the lateral edge of seat 50 and at least partially curve inward towards the occupant to form a bow-shape and/or pocket. It is contemplated, however, that in alternative embodiments, the cushion 110 may only deploy from and/or extend along only the side of the seat rather than the top as well and need not curve in the manner depicted.

It can also be better seen in FIG. 5 that the depicted embodiment is configured to provide a pocket and/or other lateral occupant engaging structure that extends from adjacent the base of the neck region of occupant 60 to just below the elbow region of occupant 60. In addition, this figure illustrates that this pocket structure extends along the side of occupant 60 opposite the side with which seat belt engages the opposite/outboard shoulder of occupant 60.

Again, this structure may be formed by allowing cushion 110 to deploy and be restrained by a tether 120 of fixed length or by using a tether release and/or retraction mechanism 130. Such a mechanism 130 may allow tether 120 to extend to a variable length, which may be defined by, for example, the size of the occupant 60 and/or the force/tension the tether 120 receives during deployment.

FIG. 5 also depicts a frontal airbag cushion 70 deploying, which may be part of an overall safety system of the vehicle within which airbag assembly 100 is positioned. Cushion 110 may therefore be configured to provide supplemental protection that may cooperate with cushion 70. Thus, in some embodiments, cushion 110 may be configured to interact with cushion 70 during deployment, such as by extending to an outer perimeter of cushion 70, either laterally or in the direction of deployment of cushion 70.

Figure 6:
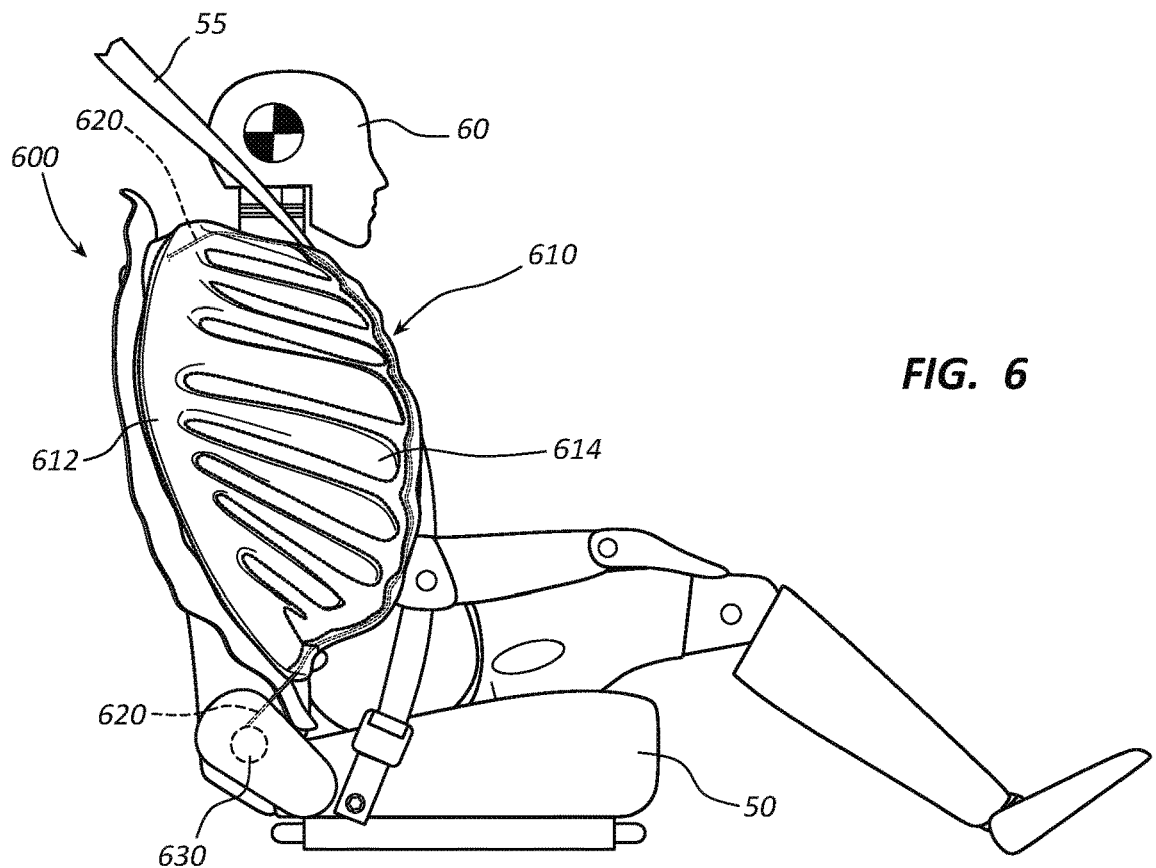
FIG. 6 depicts an alternative embodiment of a lateral engagement cushion assembly during an initial stage of deployment.
Figure 7:
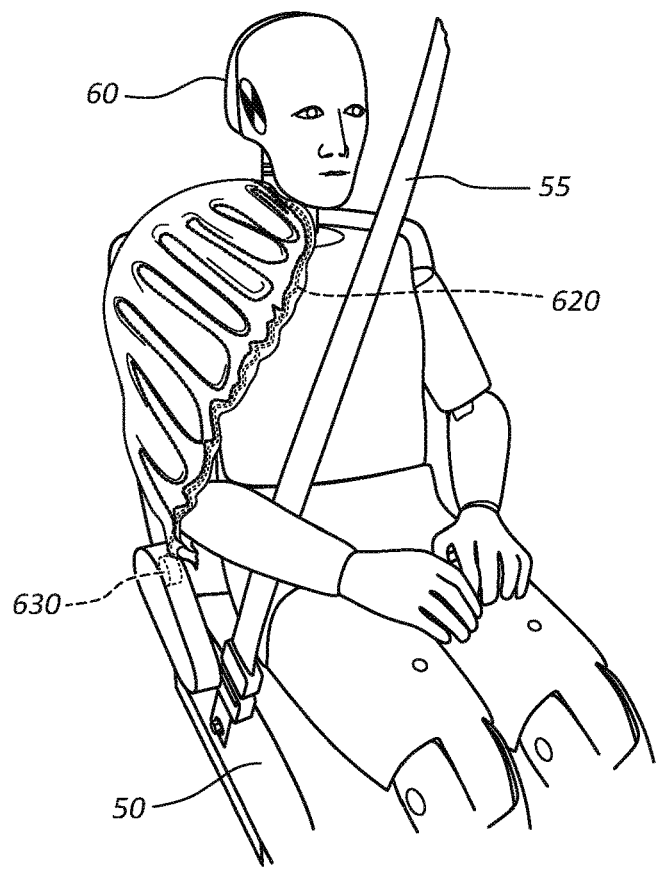
FIG. 7 depicts the embodiment of FIG. 6 during a later stage of deployment with the tether retracted to form a lateral engagement pocket.

FIGS. 6 and 7 depict an alternative embodiment of an airbag assembly 600 during deployment adjacent to a vehicle occupant 60 within a vehicle seat 50. Similar to the embodiments depicted in previous figures, the cushion 610 of assembly 600 may comprise a central chamber 612 fluidly coupled with a series of elongated finger chambers 614 extending therefrom. In addition, a tether 620 is coupled to cushion 610 so as to extend along the peripheral edge of the inflated cushion 610 and to facilitate, along with the configuration of the various chambers of cushion 610, formation of a desired shape to provide lateral protection to vehicle occupant 60, more particularly the shoulder and arm region of occupant 60 in preferred embodiments. Unlike assembly 100, however, assembly 600 comprises a tether release and/or retraction mechanism 630 that may be configured to allow the tether 620 to be released to allow the cushion to be deployed and extend adjacent to occupant 60 and then retract and lock into place.

More particularly, as shown in FIG. 6, cushion 610 initially deploys in the forward direction (relative to the vehicle) and tether 620 loosely extends along a peripheral edge of the cushion. Then, as shown in FIG. 7, tether release/retraction mechanism 630 pulls tether 620 to a smaller length, which may bend cushion 610 around the shoulder and/or upper arm region of occupant 60 to form a pocket region for preventing or at least inhibiting inboard excursion. In some embodiments, tether 620 may be permanently locked into place at this shortened length. Alternatively, the shortened length provided for by mechanism 630 may be temporary and may allow for release of tether 620 to loosen the pocket shape following an early stage of deployment.

Figure 8:
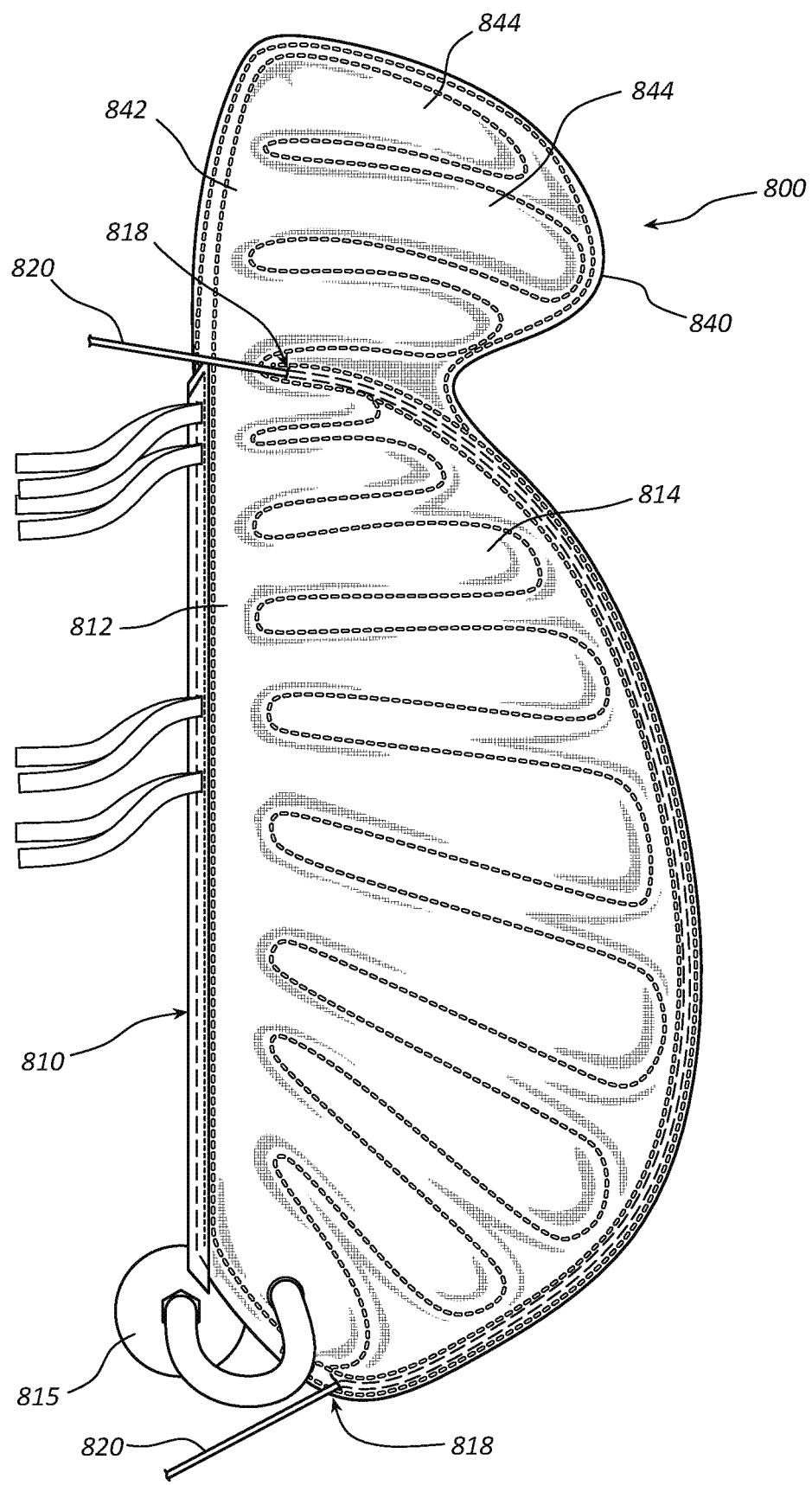
FIG. 8 depicts another example of an airbag cushion assembly for preventing or at least inhibiting lateral excursion comprising a head support cushion/region.
Figure 9:
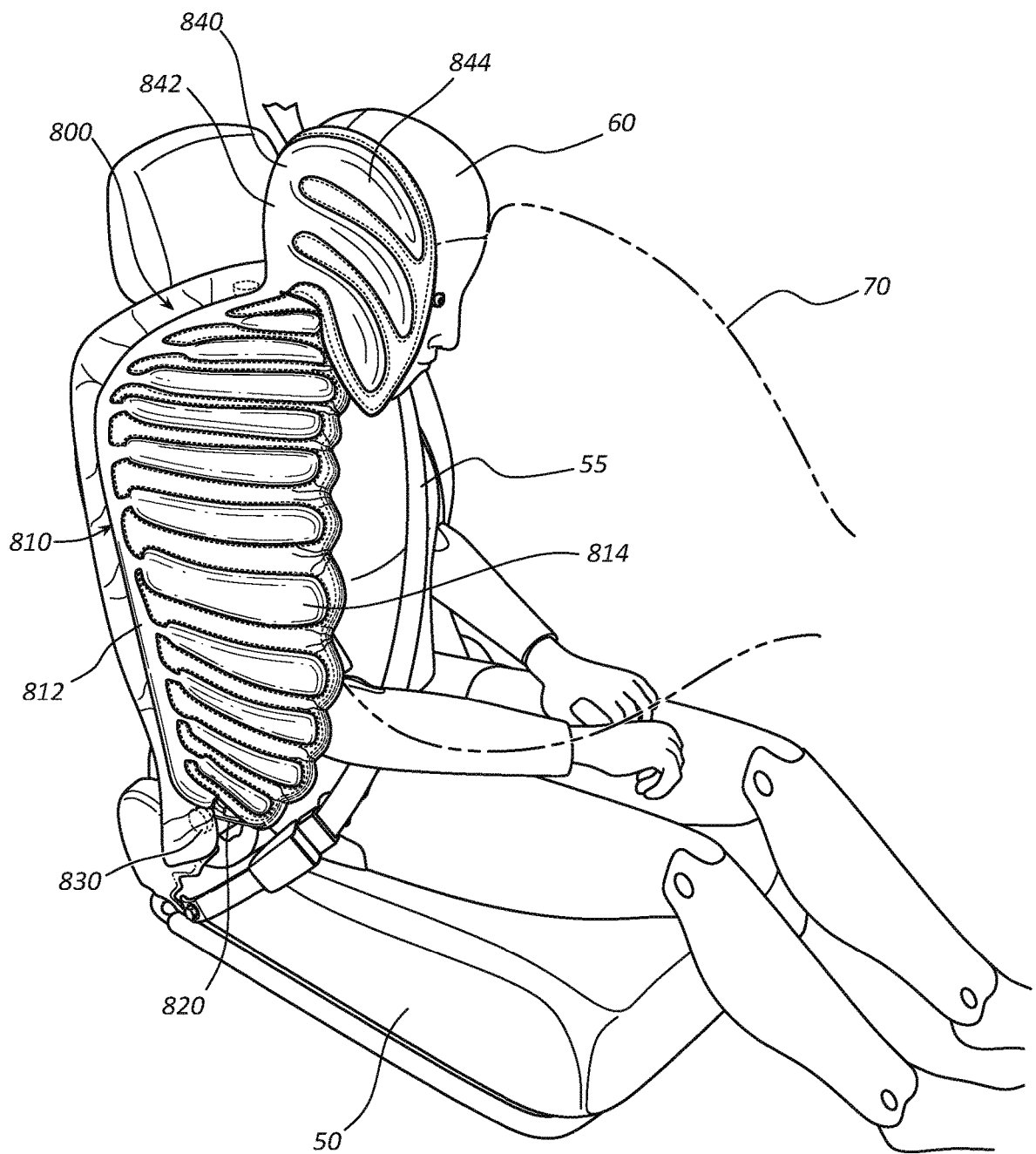
FIG. 9 depicts the airbag cushion assembly of FIG. 8 being deployed to provide lateral protection to an occupant during an impact event.

Still another embodiment of an airbag cushion assembly 800 is shown in FIGS. 8 and 9. FIG. 8 depicts airbag cushion 810 of assembly 800 following inflation. As shown therein, cushion 810 may comprise a spine or primary chamber 812 running along a pre-deployment axis of the cushion and a series of finger chambers 814 extending therefrom, as previously mentioned. However, unlike the embodiments depicted in previous figures, cushion 810 further comprises a head support region/cushion 840.

Head support region/cushion 840 is configured to provide lateral support to the head region of occupant 60 during an impact event, which may further reduce head excursion and further reduce the possibility of head/neck injuries, particularly those resulting from side impacts. Head support region/cushion 840 may, similar to the shoulder/arm region of cushion 810, be formed by a primary chamber 842 and a plurality of angled finger chambers 844. However, alternatively, region/cushion 840 may be formed using a single inflation chamber, or any other number of individual chambers as desired. Head support region/cushion 840 may be fluidly coupled with the lower chambers of cushion 810 and therefore may be inflated using the same inflator 815 or may be inflated using a separate inflator if desired.

As previously mentioned, a tether 820 may be used to form one or more regions of cushion 810 into a desired bowed, curved, and/or otherwise suitable shape for providing lateral protection to occupant 60. Again, this tether 820 may extend through a tunnel 818 extending along a peripheral edge of at least a portion of cushion 810 and may be either rigidly coupled to seat 50 at opposing ends or may be coupled at one or both ends using a mechanism, such as mechanism 830, which may comprise any of the release, retraction, and/or locking mechanisms previously mentioned. Although not shown in FIG. 8 or 9, in some embodiments, tether 820 may either extend about a peripheral edge of head support region/cushion 840 or a second tether may be provided to assist in the formation of head support region/cushion 840.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. An airbag cushion assembly, comprising:
    an inflatable cushion configured to deploy adjacent to a vehicle seat laterally of a vehicle occupant; and
    a tether coupled with the inflatable cushion and configured to be coupled to the vehicle seat at opposite ends of the tether, wherein the tether is configured to, upon deployment, form the inflatable cushion into a pocket adjacent to the vehicle occupant to engage a shoulder and arm of the vehicle occupant, and wherein the tether is variable in length following deployment.

2. The airbag cushion assembly of claim 1, wherein the inflatable cushion comprises a primary chamber and a plurality of finger chambers coupled with the primary chamber.

3. The airbag cushion assembly of claim 2, wherein following deployment each of the plurality of finger chambers extends at an at least substantially perpendicular angle from the primary chamber.

4. The airbag cushion assembly of claim 2, wherein the plurality of finger chambers comprises:
    an upper set of finger chambers;
    a middle set of finger chambers; and
    a lower set of finger chambers, wherein each of the middle set of finger chambers is longer than each of the upper and lower set of finger chambers.

5. The airbag cushion assembly of claim 2, wherein following deployment the primary chamber extends along a spine of the inflatable cushion.

6. The airbag cushion assembly of claim 1, further comprising a tether pretensioner configured to fix a released length of the tether during deployment.

7. The airbag cushion assembly of claim 6, wherein the tether pretensioner is configured to lock the tether in place upon experiencing a threshold force during deployment.

8. The airbag cushion assembly of claim 6, wherein the tether pretensioner is configured to retract the tether during deployment, and wherein the retraction of the tether bends at least a portion of the inflatable cushion to form the pocket.

9. The airbag cushion assembly of claim 1, further comprising a lateral head support cushion configured to deploy above a primary chamber adjacent to and lateral of the vehicle occupant's head.

10. The airbag cushion assembly of claim 9, wherein the lateral head support cushion is fluidly coupled with the primary chamber.

11. A vehicle, comprising:
    an inflatable cushion configured to deploy adjacent to a vehicle seat laterally of a vehicle occupant, wherein the inflatable cushion comprises a primary chamber extending along an elongated axis of the inflatable cushion following deployment; and
    a tether coupled to the vehicle seat and extending about a peripheral edge of the inflatable cushion opposite from the primary chamber following deployment, wherein the tether is configured to, upon deployment, form the inflatable cushion into a pocket adjacent to the vehicle occupant to engage a shoulder and arm of the vehicle occupant, and wherein the tether is coupled to the peripheral edge of the inflatable cushion along a line extending adjacent to the peripheral edge from an upper portion of the inflatable cushion to a lower portion of the inflatable cushion following deployment.

12. The vehicle of claim 11, wherein the inflatable cushion further comprises a plurality of finger chambers extending from the primary chamber.

13. The vehicle of claim 12, wherein the tether extends along distal ends of each of the respective finger chambers following deployment.

14. The vehicle of claim 11, wherein the tether comprises a sole tether used to form the pocket.

15. The vehicle of claim 11, wherein the tether is fixed to the seat at both opposite ends of the tether.

16. The vehicle of claim 11, further comprising a tether release mechanism, wherein the tether is fixed to the seat at a first end of the tether, and wherein the tether is at least one of extendable and retractable from the tether release mechanism at a second end of the tether opposite the first end such that a length of the tether following deployment is variable.

17. The vehicle of claim 16, wherein the tether release mechanism is configured to lock the tether in place upon experiencing a threshold force during deployment.

18. The vehicle of claim 11, wherein the inflatable cushion is positioned within an elongated airbag module positioned within the vehicle seat and extending at least partially along a side edge of the vehicle seat and at least partially along a top edge of the vehicle seat.

19. The vehicle of claim 11, further comprising a lateral head support cushion configured to deploy above the primary chamber adjacent to and lateral of the vehicle occupant's head.

* * * * *